(12) United States Patent
Flint et al.

(10) Patent No.: US 11,429,007 B2
(45) Date of Patent: Aug. 30, 2022

(54) ELECTRO-OPTICAL MODULATOR AND METHOD OF MODULATING AN OPTICAL BEAM TO CARRY AN RF SIGNAL

(71) Applicant: Leonardo UK Ltd, London (GB)

(72) Inventors: Ian Flint, Basildon (GB); Taimur Mirza, Basildon (GB); Shyqyri Hahxa, Basildon (GB)

(73) Assignee: LEONARDO UK LTD, London (GB)

( * ) Notice: Subject to any disclaimer, the term of this patent is extended or adjusted under 35 U.S.C. 154(b) by 0 days.

(21) Appl. No.: 17/418,074

(22) PCT Filed: Dec. 24, 2019

(86) PCT No.: PCT/EP2019/087018
§ 371 (c)(1),
(2) Date: Jun. 24, 2021

(87) PCT Pub. No.: WO2020/136199
PCT Pub. Date: Jul. 2, 2020

(65) Prior Publication Data
US 2022/0066278 A1    Mar. 3, 2022

(30) Foreign Application Priority Data
Dec. 24, 2018   (GB) ..................... 1821175

(51) Int. Cl.
G02F 1/21      (2006.01)
G02F 1/225     (2006.01)
H04B 10/50     (2013.01)
H04B 10/556    (2013.01)

(52) U.S. Cl.
CPC ............ G02F 1/212 (2021.01); G02F 1/2255 (2013.01); H04B 10/5053 (2013.01); H04B 10/5561 (2013.01)

(58) Field of Classification Search
CPC ... G02F 1/212; G02F 1/2255; H04B 10/5053; H04B 10/5561

(Continued)

(56) References Cited

U.S. PATENT DOCUMENTS

| 7,266,306 B1 * | 9/2007 | Harley ............. H04B 10/50575 398/182 |
| 7,957,653 B2 * | 6/2011 | Kawanishi ......... H04B 10/5051 398/186 |
| 9,344,194 B2 * | 5/2016 | Kim ................... H04B 10/5053 |
| 10,965,377 B1 * | 3/2021 | Appel ................ G02B 6/12019 |

(Continued)

FOREIGN PATENT DOCUMENTS

| EP | 2107418 A1 * | 10/2009 | .......... G02F 1/0123 |
| EP | 2541307 A1 | 1/2013 | |
| JP | 2016194613 A | 11/2016 | |

OTHER PUBLICATIONS

Kawakami et al; Asymmetric dithering technique for bias condition monitoring in optical QPSK modulator, Mar. 2010; Electronics letters vol. 46 No. 6 and pp. 1-2. (Year: 2010).*

(Continued)

*Primary Examiner* — Amritbir K Sandhu
(74) *Attorney, Agent, or Firm* — Buchanan Ingersoll & Rooney PC

(57) ABSTRACT

A Mach Zehnder modulator operates by phase modulating split optical beams with a modulating signal to create dissimilarities in the optical characteristics between the split beams. When the beams are recombined, the dissimilarities gives rise to intensity modulations that are indicative of the modulating signal. One or both beams are modulated with an RF trimming signal. The trimming signal is applied asymmetrically across the two beams thereby reducing the intensity of the optical carrier frequency in one of the beams more than in the other. By selecting the size of the trimming signal the differences in the optical amplitude of the carrier frequency in the two beams can be nulled.

19 Claims, 6 Drawing Sheets

(58) Field of Classification Search
USPC .......................................................... 398/183
See application file for complete search history.

(56) References Cited

U.S. PATENT DOCUMENTS

| | | | |
|---|---|---|---|
| 2006/0127102 A1 | 6/2006 | Roberts et al. | |
| 2012/0008963 A1* | 1/2012 | Aruga ................ | H04B 10/5561 359/279 |
| 2016/0011487 A1* | 1/2016 | Sugiyama ............ | G02F 1/0121 385/3 |
| 2018/0314127 A1* | 11/2018 | Fan ........................ | G02F 1/225 |
| 2019/0115980 A1* | 4/2019 | Ikeda ................... | H04B 10/516 |
| 2019/0212472 A1* | 7/2019 | Tennant ............... | G02B 6/3526 |
| 2022/0043320 A1* | 2/2022 | Kawakami ........... | H04B 10/516 |

OTHER PUBLICATIONS

Kawakami et al; Asymmetric dithering technique for bias condition monitoring in optical QPSK modulator, Mar. 2010; Electronics Letters vol. 46 No. 46; pp. 1 (Year: 2010).*

Kawanishi et al; High carrier Suppression Double sideband modulation using an Integrated LiNbO3 Optical modulator, 2005, IEEE, pp. 1-4. (Year: 2005).*

Bai et al., "Versatile photonic microwave waveforms generation using a dual-parallel Mach-Zehnder modulator without other dispersive elements", Optics Communications, Mar. 27, 2017, pp. 134-140.

Kawakami et al., "Asymmetric dithering technique for bias condition monitoring in optical QPSK modulator", Electronics Letters, Mar. 18, 2010, vol. 46, No. 6, 2 pages.

GB Search Report issued in corresponding Application No. GB1821175.5 dated Jul. 3, 2019.

International Search Report (PCT/ISA/210) and Written Opinion (PCT/ISA/237) dated Mar. 16, 2020, by the European Patent Office as the International Searching Authority for International Application No. PCT/EP2019/087018.

Office Action (Examination Report No. 1) dated Apr. 7, 2022, by the Australian Patent Office in corresponding Australian Patent Application No. 2019416069. (3 pages).

* cited by examiner

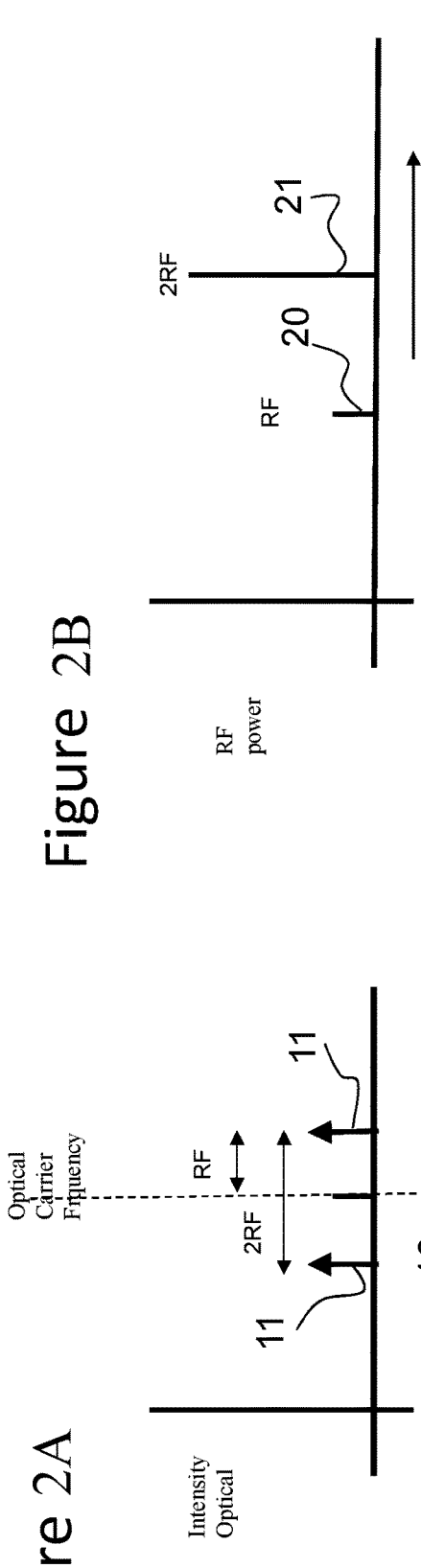
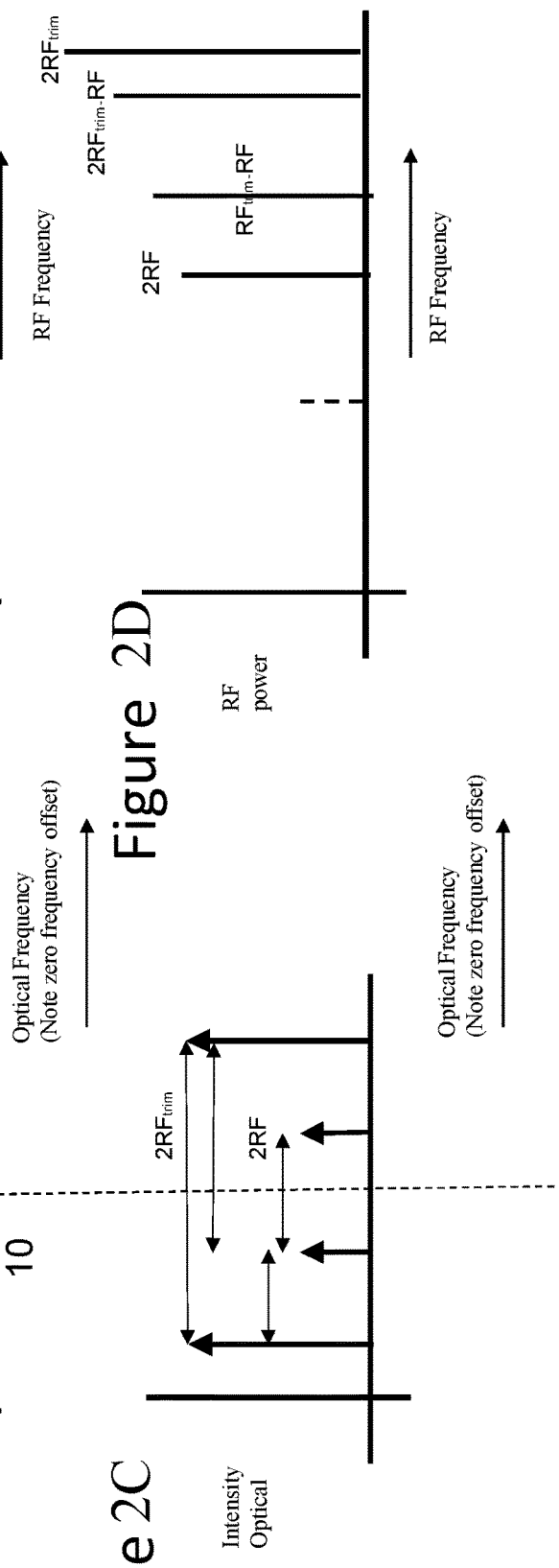
Figure 2A
Figure 2B
Figure 2C
Figure 2D

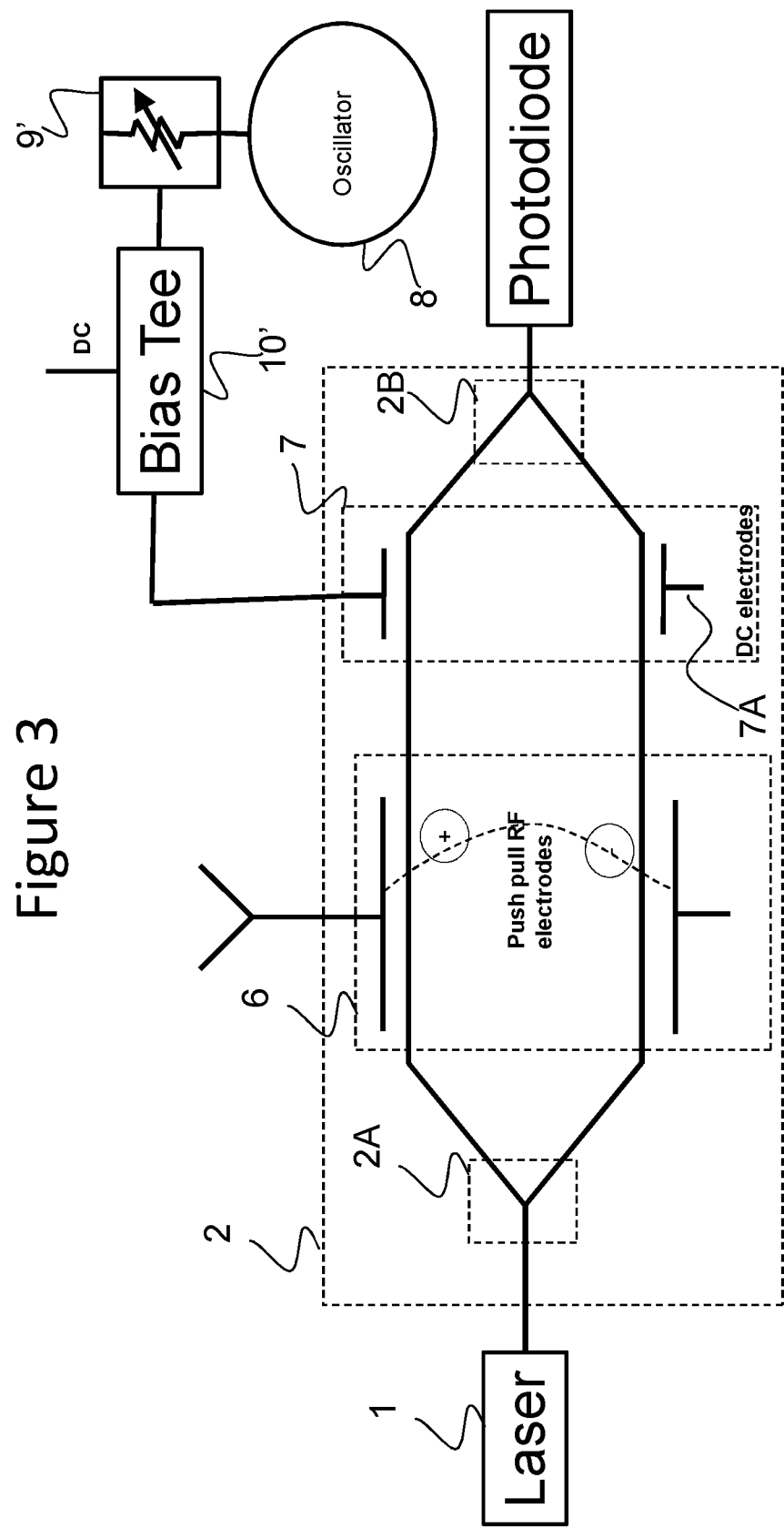

ELECTRO-OPTICAL MODULATOR AND METHOD OF MODULATING AN OPTICAL BEAM TO CARRY AN RF SIGNAL

The present invention finds use in optical links to convey radio frequency signals, e.g. from an input such as an antenna, to a processing system.

A Mach Zehnder modulator (MZM) is an electro-optic modulator used to modulate the intensity of an optical wave. It operates by splitting an optical beam into two, phase modulating at least one of the split beams with a modulating signal to create a dissimilarity in the optical characteristics (e.g. phase and/or wavelength) between the split beams, and then recombining the split beams. The dissimilarities between the split beams gives rise to intensity modulations in the recombined beam that is indicative of the modulating signal.

In certain applications it is preferred that the optical intensity of the carrier frequency in the combined beam is zero. Where this is so a non-zero amplitude value of the optical output from the modulator can in principle be attributed wholly to the modulating signal. To achieve this, in addition to applying the modulating signal, a phase shift signal is applied to at least one of the split beams in order that the two beams are nominally out of phase by 180° such that when recombined the carrier frequency is wholly nulled. This process relies on the optical amplitude of the split beams being equal when recombined. However, manufacturing tolerances of the optical components that form the modulator and packaging around the MZM create imbalance between the optical amplitude of the split beams. This gives rise to a detrimental performance of the MZM, for example a decreased extinction ratio when used to transmit a digital signal.

A low extinction ratio, corresponding to the presence of leaked light in the off state condition, is unfavourable for transmitting digital signals because it leads to higher bit error rates. A low extinction ratio is also unwanted when transmitting analogue signals as creates unwanted distortion products, reducing the dynamic range obtainable when the MZM is implemented for the purposes of optical mixing and downconvering RF signals.

The present invention ameliorates this problem.

According to a first aspect of the invention there is provided a method of adjusting the optical amplitude of a carrier frequency at an output of a modulator (e.g. a Mach Zehnder MZM); the method comprising: modulating: a first optical beam carried by a first arm of the modulator, and a second optical beam, carried by a second arm of the modulator, with an RF signal to impose the RF signal onto both the first optical beam and the second optical beam, the modulation being applied across the first and second beams relatively symmetrically; and modulating the first optical beam and/or the second optical beam within the modulator with a trimming signal, the trimming signal having a different frequency to the RF signal, the modulation with the trimming signal being applied across the first and second optical beams relatively asymmetrically.

According to another aspect of the invention there is provided a method modulating an optical carrier beam to carry an RF signal; the method comprising: carrying out a modulation process such that both: a first optical beam carried by a first arm of the modulator, and a second optical beam carried by a second arm of the modulator, carry the RF signal; and characterised in modulating the first optical beam and/or the second optical beam with a trimming signal, the trimming signal having a different frequency to the RF signal, the modulation with the trimming signal being applied across the first and second beams relatively asymmetrically to reduce a difference in the intensity of the carrier frequency between the first and second optical beams.

The following applies to both aspects described above.

The phase modulation of an optical beam with an RF signal has the effect of frequency modulating the optical signal so as to create side bands with the transfer of some of the optical power from the optical carrier frequency into the optical side bands and thus a corresponding reduction in the optical amplitude of the carrier frequency. Symmetric modulation of the RF signal will cause a substantially similar reduction in the optical amplitude of the optical carrier frequency on both arms.

With asymmetric modulation the trimming signal is applied unequally between the first and second beams such that the optical amplitude of the carrier frequency in the first and second beams is varied by differing amounts as a result of different sized side bands being formed.

Through trimming the amplitude of the carrier frequency in the beam with the larger amplitude it is possible to reduce the difference in optical intensity of the carrier signal between the first and second beams to compensate for unwanted manufacturing variation, e.g. so as to substantially match the intensity of the carrier signal of the first beam and second beam.

By extension, the invention makes it feasible to use cheaper photonic circuit components having larger tolerances and thus larger variations in intensity as these variations can be nulled.

Alternatively, trimming may be used to control a mismatch in the carrier frequency intensity between the first beam and second beam in order to extend the operational frequency range of the modulator which is usually limited through becoming imbalanced at higher frequencies.

The trimming signal may be applied asymmetrically through applying the trimming signal to only one of the first and second beams. Another method is to apply the trimming signal to both the first and second beams but unequally. This may be done, taking advantage of the characteristic that modulators are unable to modulate all frequencies equally onto both channels, by selecting a frequency for the trimming signal that cannot be modulated by the modulator on the two beams as equally as the frequency of the RF signal—the modulator being typically selected or arranged using the expected frequency range of the RF signal, to modulate the two beams with the RF signal as equally as possible. Where so, the trimming signal may be selected to be outside the operational frequency range of the modulator. Irrespective of whether the trimming signal is being apply to one or both beams, it is favourably that the trimming signal is sufficiently separated from the RF signal in frequency that it can be readily filtered out.

The modulator may be a Mach-Zehnder modulator though other modulators such as a variable optical coupler may be used instead.

The method may comprise measuring the optical intensity of the carrier frequency of the optical beam output and using the measurements to adjust the frequency and/or amplitude of the trimming signal. This could be done as a manual operation, e.g. as part of a pre-service calibration operation following manufacture, or dynamically during operation, e.g. to compensation for changes in the intensity of the carrier frequency as a result of change in temperature of the modulator and/or through vibration.

The method may comprise applying, in addition to the trimming signal, a DC voltage phase control signal to at least one of the first beam and second beam to impart an optical phase shift between the first beam and the second beam. As the DC voltage changes the phase of one or both optical beams but not the wavelength, it does not transfer energy from the optical carrier frequency to a sideband. In this way the recombined first and second beams deconstructively interfere reducing the size of the optical intensity of the carrier frequency.

In one arrangement, a phase control signal is used that causes an optical phase deviation between the first and second beam of substantially 180 degrees which allows for nulling of the intensity of the optical carrier frequency, the trimming signal being used to equalize the optical intensity of the carrier frequency of the first and second beams. However, in other applications, it may be preferred to create phase deviations other than 180 degrees. For example a phase deviation of 90 degree may be chosen in order to suppress certain RF distortions.

In one arrangement the trimming signal is combined with the RF signal and the combined trimming and RF signal imposed onto both the first beam and the second beam.

In a variant embodiment, the trimming signal may be combined with the phase control signal, typically a DC signal of substantially unvarying voltage, the combined phase control and trimming signal then applied to one of the first and second beams.

The RF signal may be applied through travelling wave electrodes so as to be imposed to both first and second beams, e.g. in a push-pull arrangement.

The RF signal may be a received RF signal, e.g. received via an antenna. Alternatively the RF signal may be an output signal from a signal processing system for transmission by an antenna. In another arrangement, the RF signal could be produced from a local oscillator which is arranged to be combined with a received RF signal in order to create a beat signal, e.g. for the purposes of up or down conversion.

According to a further aspect there is provided method of transmitting a received RF signal from an antenna via an optical link to a signal processing system using any one of the methods of adjusting the optical intensity of a carrier frequency at an output of a Mach Zehnder modulator (MZM) described above.

According to another aspect of the invention there is provided a method for adjusting the optical intensity of a carrier frequency of an output beam of a mixer, the mixer comprising a multi-parallel Mach Zehnder modulator having a first Mach Zehnder modulator and a second Mach Zehnder modulator, the outputs of the first and second Mach Zehnder modulators being recombined to provide an output of the multi-parallel Mach Zehnder modulator, the method comprising: using any of the methods various described above with the first Mach Zehnder modulator to impose a first RF signal and the trimming signal to the output of the first Mach Zehnder modulator; using the second Mach Zehnder modulator to impose a second RF signal to the output of the second Mach Zehnder modulator; one of the first RF signal and second RF signal comprising a received RF signal, and the other comprising a RF signal generated from a local oscillator such that output of multi-parallel Mach Zehnder modulator carries a beat signal.

According to a further aspect of the invention there is provided apparatus for modulating an optical channel to impose an information signal thereon, the apparatus comprising: a laser, a Mach Zehnder modulator (MZM), the MZM comprising: a beam splitter that splits an output from the laser to provide a first and a second optical beams; a phase modulator means arranged to modulate the first and second optical beams so as to impose a RF signal onto each, the RF signal being applied to the first beam and second beam relatively symmetrically; a combiner that re-combines the modulated first and second optical beams; the apparatus further comprising a trimming signal generator that generates a trimming signal of a different frequency from the RF signal; the phase modulator means arranged to modulate the first optical beam and/or a second optical beam with the trimming signal such that the trimming signal is applied relatively asymmetrically across the first and second optical beams.

The apparatus may comprise means (e.g. an optical sensor such as an electro-optical sensor) to measure the optical intensity of the output of the combiner and produce an optical intensity signal indicative thereof, and means (e.g. a signal amplitude adjustor, e.g. implemented using a variable attenuator) arranged to receive the optical intensity signal and in response adjust the amplitude of the trimming signal.

The apparatus may comprise a signal combiner arranged to combine the trimming signal with the RF signal. The modulating means may then be arranged to modulate the first and second beams with the combined trimming signal and RF signal from the combiner.

The apparatus may be used to provide, at least in part, an optical link to convey radio frequency signals, e.g. from an input such as an antenna, to a processing system.

In another aspect there is provided a mixer, the mixer comprising a multi-parallel Mach Zehnder modulator having: a first Mach Zehnder modulator, a second Mach Zehnder modulator, and a combiner arranged to combine the outputs of the first and second Mach Zehnder modulators to provide an output of the multi-parallel Mach Zehnder modulator, the first Mach Zehnder modulator arranged to modulate a first optical beam carried by a first arm of the first Mach Zehnder modulator, and a second optical beam, carried by a second arm of the first Mach Zehnder modulator, with a first RF signal to impose the first RF signal onto both the first optical beam and the second optical beam relatively symmetrically, and modulate the first optical beam and/or the second optical beam with a trimming signal, the trimming signal having a different frequency to the first RF signal, the trimming signal being applied across the first and second optical beams relatively asymmetrically; the second Mach Zehnder modulator arranged to modulate a third optical beam carried by a first arm of the second Mach Zehnder modulator and a fourth optical beam, carried by a second arm of the second Mach Zehnder modulator, with a second RF signal to impose the second RF signal onto both the third optical beam and the fourth optical beam relatively symmetrically; one of the first RF signal and second RF signal comprising a received RF signal, and the other comprising a RF signal generated from a local oscillator (LO) such that output of multi-parallel Mach Zehnder modulator carries a beat signal.

The mixer may form part of an optical link, e.g. to convey received RF signal from an input such as a antenna, to a processing system. The mixer may be used to mix the RF signal with the LO signal from the local oscillator for the purpose of upconversion or downconversion.

The link may include means (e.g. an optical sensor such as a photodiode) to measure the optical intensity of the output of the mixer and produce an optical intensity signal indicative thereof, and means (e.g. a signal amplitude adjustor, e.g. implemented using a variable attenuator) arranged to receive the optical intensity signal and in response adjust the amplitude of the trimming signal.

The invention will now be described by way of example with reference to the following figures in which:

FIG. 2A is a simplified chart of optical intensity over optical frequency for an optical output of a MZM that has been used to impose an RF signal on a carrier beam without a trimming signal;

FIG. 2B is a simplified chart of RF power over RF frequency of the resulting electrical signal derived from the characteristics of the optical output described in FIG. 2A;

FIG. 2C is a simplified chart of optical intensity over optical frequency for an optical output of a MZM that has been used to impose an RF signal and trimming signal on a carrier beam to remove the breakthrough optical carrier frequency;

FIG. 2D is a simplified chart of RF power over RF frequency of the resulting electrical signal derived from the characteristics of the optical output described in FIG. 2C;

FIG. 3 is a schematic of a variant optical link to carry an RF signal;

Figure 5:
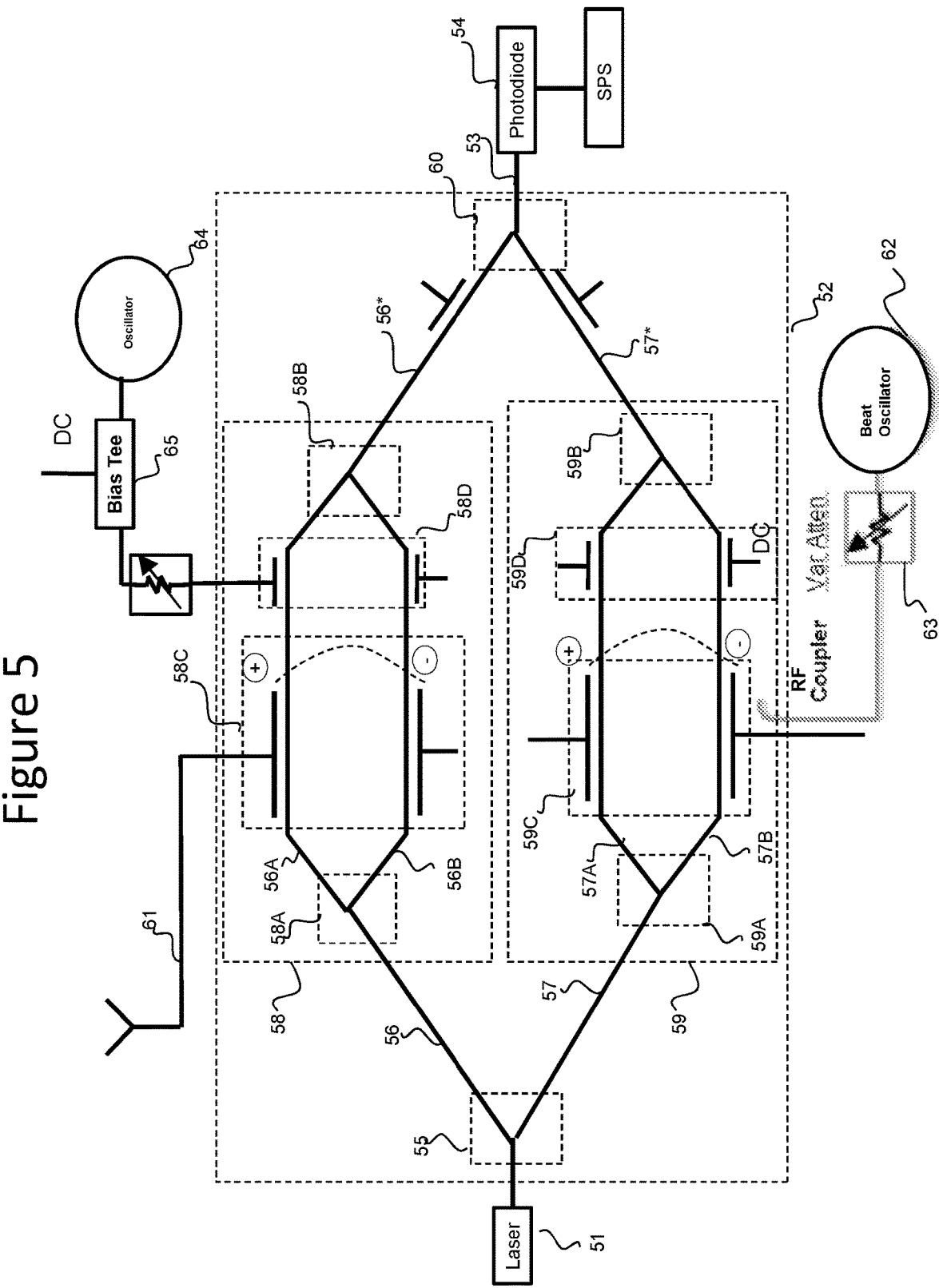
FIG. 5 is a schematic of an optical mixer that mixes a received signal with a LO signal from a local oscillator to produce an intermediate frequency beat signal.
Figure 6B:
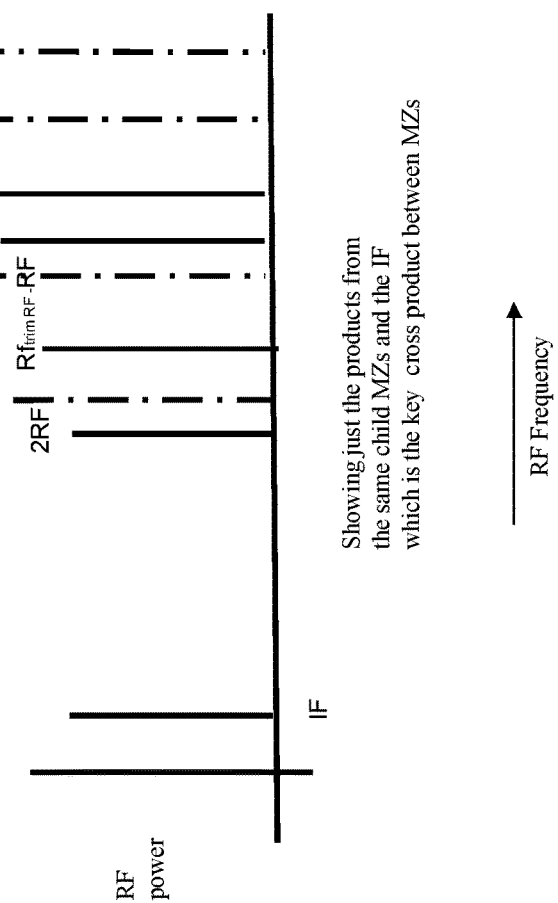
Figure 6A:
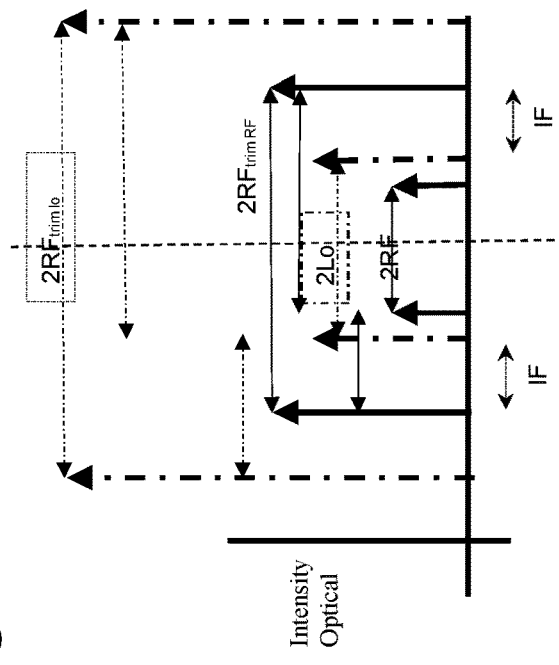

FIG. 6A is a simplified chart of optical intensity over optical frequency for an optical output of the mixer of FIG. 5 that has been used to impose an RF signal, LO signal and trimming signal on a carrier beam to remove the breakthrough optical carrier frequency; and FIG. 6B is a simplified chart of RF power over RF frequency of the resulting electrical signal derived from the characteristics of the optical output described in FIG. 6C.

Figure 1:
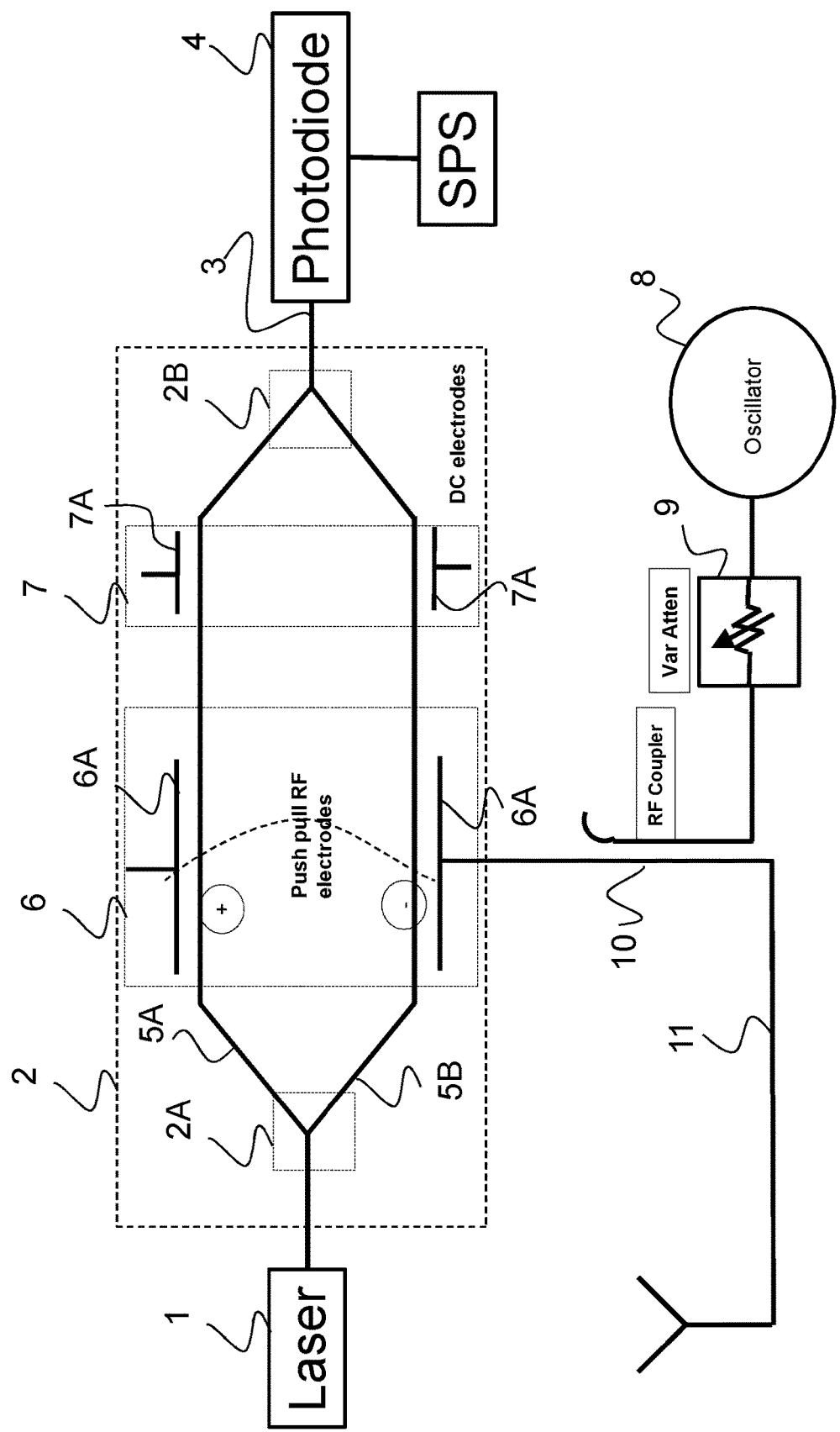
FIG. 1 is a schematic of an optical link to carry an RF signal.

With reference to FIG. 1 there is shown optical link apparatus comprising a laser 1, e.g. a semiconductor laser, a Mach Zehnder modulator 2 (MZM), an optical waveguide 3 (e.g. fibre) to convey a combined channel output of the MZM 2 to a photoelectric transducer (photo diode) 4 arranged to output an electrical signal corresponding to the optical signal output of the MZM 2, to a signal processing system (SPS). In one example the optical link is arranged to carry a received RF signal, e.g. a wideband RF signal (i.e. having a pass band spanning several octaves).

The Mach Zehnder modulator (MZM) 2 comprises an optical splitter 2A, e.g. Y-junction or a MIMI (multi mode interferometer) that splits a collimated beam from the laser 1 through two arms of the MZM 2 to provide a first optical channel 5A and a second optical channel 5B; and a combiner 2B, which may also comprise a Y-junction or a MMI, that recombines the optical channels 5A, 5B to provide an optical output of the MZM 2 to be conveyed by waveguide 3. Between the optical splitter 2A and optical combiner 2B the MZM 2 comprises a first phase modulator 6 comprising a first set of electrodes 6A and a second phase modulator 7 comprising a second electrode or set of electrodes 7A.

In use a substantially unchanging DC voltage is applied to the second electrode or set of electrodes 7A of second modulator 7 to alter the relative optical phase (but not relative wavelength) between the first and second optical channels 5A, 5B. The magnitude of the phase difference is controlled through control of the magnitude of the DC voltage. Common phase differences that can be used are 90° and 180° depending on purpose.

The optical link apparatus further comprises a local oscillator 8 to produce an RF trimming signal, a variable attenuator 9 to adjust the amplitude of the trimming signal and combiner 10, e.g. a RF coupler, arranged to combine the trimming signal from the local oscillator 8 with a received radio frequency signal from an input 11 (e.g. in this example from an antenna) to be carried by the optical link. The received RF signal may be analogue or digital and may have been amplified beforehand. The combined received signal and trimming signal output of the combiner 10 is fed to the first set of electrodes 6A of the first phase modulator 6 to be imposed on both the first and second channels 5A,5B.

The first phase modulator 6 is of conventional form. To minimise chirp, the electrodes 6A may be coupled in a push-pull configuration such that the combined signal induces opposite refractive index changes in the optical waveguide of the respective arms of the MZM 2 and thus opposite phase shifts in the first and second channels 5A 5B.

The modulator 6 is selected and arranged, using techniques known to those skilled in the art, to ensure that all expected frequencies of the received RF signal are modulated onto the first and second channels 5A,5B as symmetrically as possible, namely that for any frequency of the RF signal, the corresponding side band in the first channel will be substantially the same amplitude as the corresponding side band in the second channel such that the overall reduction in the optical power of the carrier frequency of the two channels will be substantially the same.

In practice, particularly where the RF signal is a wideband signal e.g. 2 GHz-20 GHz, application is unlikely to be completely symmetrical as some frequencies are likely to couple more to the first channel, and other frequencies likely to couple more with the second channel. Although not wishing to be bound to any particular theory, the inventor believes this is largely attributable to the packaging around the chip on which the MZM is formed.

Taking advantage of this variation, the frequency of the trimming signal is purposely selected such that the modulator 6 is unable to modulate it onto the first channel 5A and second channel 5B as symmetrically as the received RF signal. This ensures that the trimming signal is coupled more to one of the first and second channels 5A, 5B than the other. The application of the trimming signal results in a reduction in the amplitude of the carrier frequency of both channels with a greater reduction in the channel to which the trimming signal couples more strongly.

By choosing a frequency of the trimming signal that is significantly remote from the RF signal band, the trimming signal will be applied in a stronger asymmetrical fashion and its associated harmonics will be straightforward to filter out by the signal processing system SPS. For example, where the received RF signal is a wideband signal of passband extending at least over 2 GHz and 20 GHz, a trimming signal favourably has a frequency of 30 GHz or above.

Varying the power (amplitude) of the trimming signal using the variable attenuator 9 can be used to control the extent that the optical power of the carrier frequency in one of the channels 5A, 5B is reduced (trimmed) compared with the other channel.

In one application, the power of the trimming signal may be selected to compensate for an optical intensity mismatch of the first and second channels. This is achieved by causing the trimming signal to be coupled to a greater extent into the channel that has the optically higher amplitude such that it trimmed more, and adjusting the strength of the trimming signal until the optical intensities of the two channels match.

In one arrangement the DC voltage applied to the second channel is selected to create a phase mismatch between the first and second channels of 180° such that the carrier frequency of the recombined channel is suppressed to a maximum extent. The optical amplitude of the carrier frequency of the channels can then be trimmed to compensate for disparity in optical amplitude of the carrier frequency between the channels in order to more precisely null the carrier frequency of the recombined channel.

A calibration process may comprise imposing an in band test signal onto the RF electrodes. A trimming signal is selected that is outside of RF signal band (so that it can be easily distinguished from the RF signal) and outside of the designed frequency band of the modulator (so that it will be applied asymmetrically), and then varying the frequency of the trimming signal from the selected frequency until the measured optical intensity of the carrier frequency at the output of the modulator reaches a desired value, e.g. null.

FIG. 2A is a chart showing intensity over optical frequency spectrum of the recombined channel carried by waveguide 3 to the photodiode 4 without the application of a trimming signal; the first and second channels having been put out of phase by 180° using modulator 7. The amplitude imbalance of the first and second channels results in carrier breakthrough 10 and side bands 11 from the RF signal imposed onto the first and second channels 5A, 5B. FIG. 2B is a simplified RF spectrum showing fundamental (RF) 20 having a frequency corresponding to the spacing between the carrier breakthrough and each sideband 11, and a 2RF signal 21 having a frequency corresponding to the spacing between the side bands 11.

FIG. 2C is a chart similar to that of FIG. 2A showing optical intensity over optical frequency of the recombined optical channel with the application of a trimming signal arranged to equalize the intensities of the first and second channels 5A, 5B such as to null the intensity of the carrier frequency. As a result there is no carrier breakthrough and therefore no fundamental in the RF spectrum shown in FIG. 2D.

FIG. 3 illustrates and alternative embodiment in which the trimming signal derived from local oscillator 8 is instead combined with the DC voltage by a combiner 10' e.g. comprising a hybrid or bias T. The strength of the trimming signal can be controlled with variable attenuator 9'. An alternative to using an attenuator would to vary the power of the oscillator 8.

The arrangement of FIG. 3 may provide an advantage over the arrangement of FIG. 1 of avoiding cross-talk between the RF signal and trimming signal.

The arrangement of FIG. 3 provides a convenient means to apply the trimming signal to a single channel only. A possible disadvantage of this arrangement is that may provide less effective coupling of the trimming signal because DC electrodes are not designed to carry RF signals.

In a further arrangement (not shown), the MZM 2 may comprise a third electrode or pair of electrodes used to apply the trimming signal to the first and second channels separately from the received RF signal or DC voltage.

Figure 4:
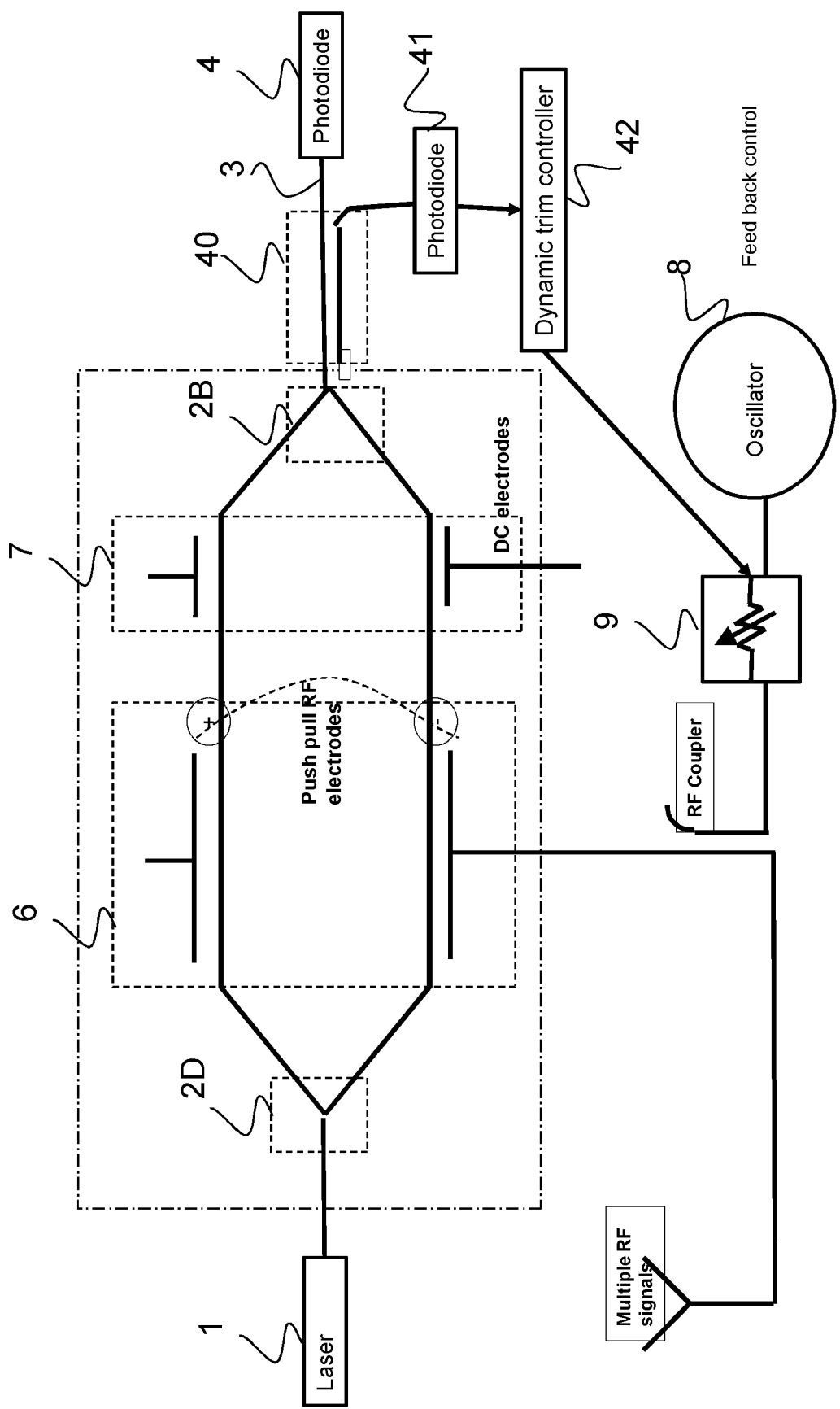
FIG. 4 is a schematic of a variant optical link that provides for dynamic adjustment of the trimming signal.

FIG. 4 is a schematic of an optical link apparatus to carry an RF signal that provides for dynamic adjustment of the trimming signal to compensate for changes in the optical amplitude of the carrier frequency of the first and/or second channel over time; such changes being a result, for example, of vibration or thermal fluctuations.

To provide this function the link apparatus comprises an optical coupler 40 arranged to couple out a portion of the output 3 of the MZM 2. An electro-optical transducer 41 converts the output of the coupler 40 into an electrical signal that forms the input to a dynamic trim controller 42 implemented by for example, an analogue control loop or a microprocessor. The dynamic trim controller 42 acts to alter the trimming signal from the local oscillator 8 by providing an output that controls the variable attenuator 9 (or 9' if the trimmer is implemented in the form shown in FIG. 3) to alter the strength of the trimming signal.

For example, where the channels 5A, 5B are phase separated by 180° using second modulator 7, the dynamic trim controller 42 may be arranged, in response to an input from the electro-optic transducer 41 indicative of the presence of carrier frequency in the output 3 to operate variable attenuator 9 to increase the strength of the trimming signal to substantially null the amplitude of the tone frequency fundamental, which will as a result also null the carrier frequency.

FIG. 5 is a schematic of an optical link comprising a dual-parallel Mach Zehnder modulator used as a mixer for up conversion, e.g. of a signal to be transmitted, or down conversion e.g. of a received RF signal prior to processing.

The optical link 50 comprises a laser 51, e.g. a semiconductor laser, a dual-parallel Mach Zehnder modulator 52, an optical waveguide 53 (e.g. fibre) to convey a combined channel output of the dual-parallel Mach Zehnder modulator to a electro-optical transducer (photo diode) 54 arranged to produce an electrical signal from a signal carried by the combined channel output to a signal processing system SPS.

The dual-parallel Mach Zehnder modulator 52 comprises a first optical splitter 55 that splits the output of the laser 51 to provide a first parent channel 56 and a second parent channel 57; a first Mach Zehnder modulator 58 comprising a splitter 58A that splits the first parent channel 56 into a first child channel 56A and a second child channel 56B and a combiner 58B that recombines the first and second child channels to provide a recombined output 56*; a second Mach Zehnder modulator 59 comprising a splitter 59A that splits the second parent channel 57 into a third child channel 57A and a fourth child channel 57B, and combiner 59 that combines the third and fourth 57A, 57B child channels to provide a second recombined output 57*. The dual-parallel Mach Zehnder modulator 52 comprises a further combiner 60 that combines the first recombined output 56* and second recombined output 57* to provide the recombined output channel 53 of the dual-parallel Mach Zehnder modulator 52.

Each of the first and second Mach Zehnder modulators comprise a first phase modulator 58C 59C and a second phase modulator 58D 59D. A DC voltage can be applied via the second modulators 58D 59D in order to produce phase displacement between the first child channel 56A and second child channel 56B, and/or third child channel 57A and fourth child channel 57B.

A received RF signal (analogue and/or digital) from an input 61 is imposed relatively symmetrically upon the first child channel 56A and second child channel 56B by first modulator 58C. A local oscillator signal (LO) from a local oscillator 62 is imposed upon the third child channel 57A and fourth child channel 57B relatively symmetrically. When the outputs 56* and 57* are combined by combiner 60, the LO signal is mixed with the RF signal to produce an intermediate frequency beat signal in combined channel output 53. The amplitude of the LO signal can be controlled by variable attenuator 63.

A trimming signal generated by a further local oscillator 64 is combined with a DC voltage signal by combiner 65 (in this case a bias tee) and applied relatively asymmetrically, compared with the received RF signal and LO signal, to either the first and/or second child channels, by the second modulator 58D of first MZM 58.

Alternatively, the trimming signal may be combined with the received RF signal and applied through the first phase modulator 58C of the first MZM 58; combined with the LO signal from local oscillator 62 and applied by the first phase modulator 59C of the second MZM 59 or combined with DC signal and applied by second phase modulator 59D of the second MZM 59. The trimming signal may be applied by both MZMs 58,59 in order to trim both outputs 56*, 57*, further alternatively, a separate trimming signal may be generated for application by each MZM 58, 59.

With reference to FIGS. 6A-6B (in which certain optical side bands, not relevant to final signal output, including the trimming signal are omitted to improve the clarity of figures) by removing the breakthrough signal, the RF signal and LO signal are suppressed in the combined channel output 53. This removes the need to filter out these products, which are close in frequency to the intermediate frequency. This is particularly beneficial for the LO which is often relatively strong compared with the intermediate frequency. Suppressing the RF and LO simplifies data signal processing which allows for lower power consumption, cheaper production and reduces the mass of the processing system as fewer filters are needed.

In a variant to that variously described above, the LO signal may also provide the function of the trimming signal, altering the strength of the carrier frequency. A possible disadvantage of this method is that it affects the size of the intermediate frequency signal, thus the power required to provide the desired extent of trimming of the optical carrier frequency may not correspond with the power to provide the desired strength of the intermediate frequency signal.

In a further variant to the above embodiments, the power of the trimming signal (or combined signal comprising the trimming signal) may be adjusted using a variable gain oscillator rather than a variable attenuator.

The trimming signal can be filtered out using a suitable RF filter following conversation of the light to photocurrent. Alternatively the frequency of the trimming signal could be selected so as to be above the frequency response of the photodiode that receives the output of the modulator.

The invention claimed is:

1. A method for modulating an optical carrier beam to carry an RF signal, the method comprising:
   carrying out a modulation process such that both:
      a first optical beam carried by a first arm of a modulator, and
      a second optical beam carried by a second arm of the modulator,
   carry the RF signal; and
   modulating the first optical beam and/or the second optical beam with an RF trimming signal, the trimming signal having a different frequency to the RF signal, the modulation with the trimming signal being applied across the first and second optical beams asymmetrically to form different sized side bands in the first and second optical beams so as to reduce a difference in an intensity of a carrier frequency between the first and second optical beams.

2. The method according to claim 1, comprising:
   measuring an optical intensity of the carrier frequency of an output of the modulator to adjust an amplitude of the trimming signal.

3. The method according to claim 1, comprising:
   selecting an amplitude of the trimming signal to cause an optical intensity of the carrier frequency of the first and second beams to match.

4. The method according to claim 1, comprising:
   applying the trimming signal to both the first beam and the second beam.

5. The method according to claim 4, comprising:
   combining the trimming signal with the RF signal, the first beam and the second beam being modulated with the combined trimming signal and the RF signal.

6. The method according to claim 4, comprising:
   selecting the frequency of the trimming signal such that it will be applied more asymmetrically across the first and second beams than the RF signal.

7. The method according to claim 1, comprising:
   applying a phase control signal from a direct current source to at least one of the first beam and second beam to impart an optical phase shift between the first beam and the second beam.

8. The method according to claim 7, comprising:
   combining the trimming signal with the phase control signal before being applied to at least one of the first beam and second beam.

9. A method for adjusting an optical intensity of a carrier frequency of a output beam of a mixer, the mixer having a multi-parallel Mach Zehnder modulator having a first Mach Zehnder modulator and a second Mach Zehnder modulator, outputs of the first and second Mach Zehnder modulators being recombined to provide an output of the multi-parallel Mach Zehnder modulator, the method comprising:
   applying the method of claim 1 with the first Mach Zehnder modulator to impose a first RF signal and the trimming signal to an output of the first Mach Zehnder modulator; and
   using the second Mach Zehnder modulator to impose a second RF signal to an output of the second Mach Zehnder modulator.

10. The method according to claim 1, comprising:
    conveying radio frequency signals from an antenna to a processing system or vice versa via an optical link by the modulating of an optical carrier.

11. The method according to claim 1, comprising: measuring an optical intensity of the carrier frequency of an output of the modulator to adjust an amplitude of the trimming signal.

12. The method according to claim 11, comprising:
    selecting the amplitude of the trimming signal to cause the optical intensity of the carrier frequency of the first and second beams to substantially match.

13. The method according to claim 1, comprising: applying the trimming signal to both the first beam and the second beam.

14. The method according to claim 1, comprising: applying a phase control signal from a direct current source to at least one of the first beam and second beam to impart an optical phase shift between the first beam and the second beam.

15. An apparatus for modulating an optical channel to impose an RF signal thereon, the apparatus comprising:
    a laser:
    a modulator, the modulator including:
       a beam splitter that split an output from the laser to provide first and second optical beams;
       a phase modulator means arranged to modulate the first and second optical beams so as to impose an RF signal onto each, the RF signal being applied to the first optical beam and second optical beam symmetrically;

the apparatus further comprising an RF trimming signal generator configured for generating a trimming signal of a different frequency from the RF signal; the phase modulator means being arranged to modulate the first optical beam and/or second optical beam with the trimming signal such that the trimming signal in operation will be applied relatively asymmetrically across the first and second optical beams to form different sized side bands in the first and second optical beams so as to reduce a difference in an intensity of a carrier frequency between the first and second optical beams.

16. The apparatus according to claim 15, comprising:

a combiner to combine the first and second optical beams;

a sensor to measure an optical intensity of an output of the combiner and produce an optical intensity signal indicative thereof; and means arranged to receive the optical intensity signal and configured in response to adjust an amplitude of the trimming signal.

17. The apparatus according to claim 15, wherein the phase modulator means comprises:

one or more phase modulators arranged to modulate the first and second optical beams so as to impose a RF signal onto each, the RF signal being applied to the first optical beam and second optical beam relatively symmetrically; and one or more further phase modulators arranged to apply a phase control signal from a direct current source to at least one of the first optical beam and second optical beam to impart an optical phase shift between the first optical beam and the second optical beam.

18. An optical link configured to convey radio frequency signals from an antenna to a processing system or vice versa, using the apparatus of claim 15.

19. A mixer comprising:

a multi-parallel Mach Zehnder modulator having:
 a first Mach Zehnder modulator;
 a second Mach Zehnder modulator; and a combiner configured and arranged to combine outputs of the first and second Mach Zehnder modulators to provide an output of a multi-parallel Mach Zehnder modulator, the first Mach Zehnder modulator being configured and arranged to modulate a first optical beam carried by a first arm of the first Mach Zehnder modulator, and a second optical beam, carried by a second arm of the first Mach Zehnder modulator, with a first RF signal to impose the first RF signal onto both the first optical beam and the second optical beam symmetrically, and to modulate the first optical beam and/or the second optical beam with an RF trimming signal, the trimming signal having a different frequency to the first RF signal, the combiner being configured to apply the trimming signal across the first and second optical beams asymmetrically to form different sized side bands in the first and second optical beams so as to reduce a difference in an intensity of a carrier frequency between the first and second optical beams;

the second Mach Zehnder modulator being configured and arranged to modulate a third optical beam carried by a first arm of the second Mach Zehnder modulator and a fourth optical beam, carried by a second arm of the second Mach Zehnder modulator, with a second RF signal to impose the second RF signal onto both the third optical beam and the fourth optical beam symmetrically; and one of the first RF signal and the second RF signal including a received RF signal, and the other including a RF signal generated from a local oscillator such that an output of multi-parallel Mach Zehnder modulator will carry a beat signal.

* * * * *